United States Patent [19]
Kobayashi et al.

[11] Patent Number: 6,130,965
[45] Date of Patent: *Oct. 10, 2000

[54] IMAGE DATA OUTPUTTING APPARATUS AND FACSIMILE APPARATUS IN WHICH IMAGE DATA ON A PLURALITY OF RECORD SHEETS ARE COMBINED INTO ONE PAGE OF IMAGE DATA FOR TRANSMISSION

[75] Inventors: Makoto Kobayashi, Kawasaki; Toru Maeda, Mitaka; Hitoshi Saito, Yokohama; Masanori Momose, Tokyo; Toru Fujino, Urawa; Shinichiro Kohri, Kawasaki; Kazuhiro Sugawara, Tokyo; Satoshi Imai, Koganei; Naomi Nakamura, Kawaguchi; Yasushi Morimoto, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/691,680

[22] Filed: Aug. 2, 1996

[30] Foreign Application Priority Data

Aug. 3, 1995 [JP] Japan ................................. 7-198655
Oct. 23, 1995 [JP] Japan ................................. 7-297288

[51] Int. Cl.[7] ................................................ H04N 1/23
[52] U.S. Cl. ........................... 382/284; 382/286; 358/450
[58] Field of Search .................................. 358/450, 449, 358/453, 451; 382/284, 286, 298

[56] References Cited

U.S. PATENT DOCUMENTS

| | | | |
|---|---|---|---|
| 5,191,429 | 3/1993 | Rourke | 358/296 |
| 5,467,203 | 11/1995 | Kawata | 358/451 |
| 5,585,936 | 12/1996 | Eto et al. | 358/450 |
| 5,654,807 | 8/1997 | Miyaza | 358/450 |

OTHER PUBLICATIONS

Fishman et al. The Book of Fax, Ventana Press, Inc, pp. 38–39, Dec. 1990.

*Primary Examiner*—Thomas D. Lee
*Assistant Examiner*—Stephen Brinich
*Attorney, Agent, or Firm*—Fitzpatrick, Cella, Harper & Scinto

[57] ABSTRACT

A facsimile avoids waste of record sheets due to recording of image data only at the top of a record sheet with the bottom of the sheet being left blank. This is achieved by summing the number of lines on a plurality of document sheets, with the sum being compared with the sub-scan length of the record sheet, and if the sum can be accommodated by the record sheet, the image data of the plurality of document sheets are combined as one page of image data for transmission.

30 Claims, 9 Drawing Sheets

2 IN 1 - TRANSMIT ?

* = YES          # = NO 6,130,965

IMAGE DATA OUTPUTTING APPARATUS AND FACSIMILE APPARATUS IN WHICH IMAGE DATA ON A PLURALITY OF RECORD SHEETS ARE COMBINED INTO ONE PAGE OF IMAGE DATA FOR TRANSMISSION

BACKGROUND OF THE INVENTION

1. Field of the Invention

The present invention relates to a data outputting apparatus having a function of reading images of a plurality of pages of document sheets loaded in an image read unit and transmitting the read image data to a predetermined transmission destination.

2. Related Background Art

In the prior art, in a transmission function to read images of a plurality of pages of document sheets loaded in the image read unit and transmitting the read image data to the predetermined transmission destination, it is transmitted page by page without regard to a length along a sub-scan direction of the read image.

In the prior art, when the document sheet having a short length along the sub-scan direction is transmitted page by page and the receiving unit records the received images on cut sheets of a predetermined size, page by page, the images are recorded on only top areas of the record sheets and large blank areas are left in the bottom areas. This causes wasteful use of the record sheet.

Further, when a plurality of pages of document sheets having a short sub-scan side length are transmitted in volume, the receiving unit records the received image on different record sheets for respective received pages resulting in a large volume of record sheets. This causes inconvenience in reading.

SUMMARY OF THE INVENTION

It is an object of the present invention to prevent waste of record sheets at the receiving unit when a plurality of pages of image data having a short sub-scan side length is transmitted.

It is another object of the present invention to prevent an increase of record sheets at the receiving unit causing inconvenience in reading when a plurality of pages of image data having a short sub-scan side length is transmitted in volume.

It is another object of the present invention to provide a facsimile apparatus which prevents the waste of blank area on the record sheet at the receiving unit in a polling transmission mode.

It is a further object of the present invention to provide a facsimile apparatus which permits a user to select whether the image is to be transmitted by coupling a plurality of pages in the polling transmission mode.

DETAILED DESCRIPTION OF THE PREFERRED EMBODIMENTS

Embodiments of the present invention are now explained with reference to the drawings.

Embodiment 1

Figure 1:
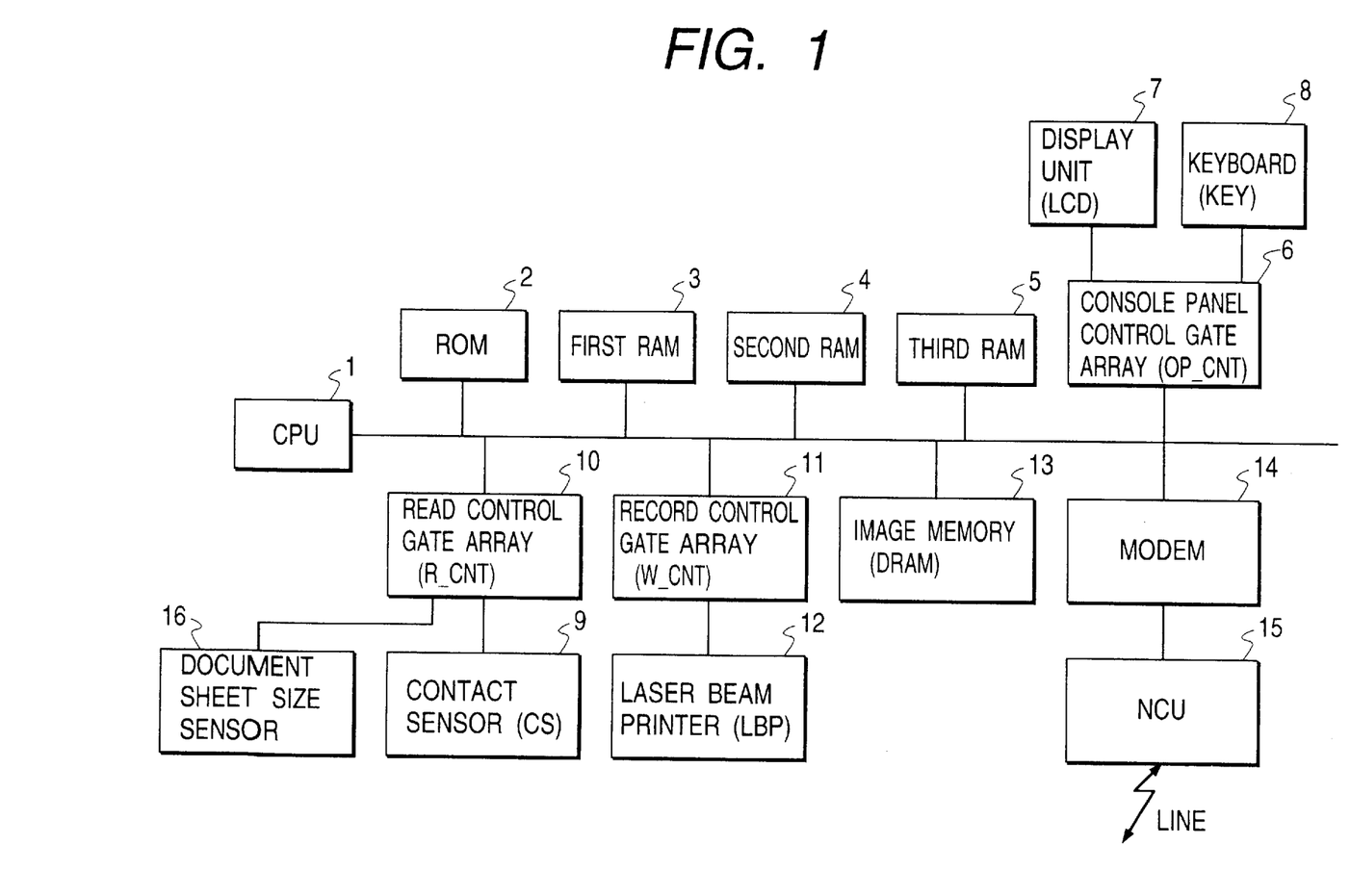
FIG. 1 shows a block diagram of a configuration of a facsimile apparatus in accordance with Embodiments 1 and 2 of the present invention.

Embodiment 1 is first explained with reference to FIGS. 1, 2, 3 and 4. FIG. 1 shows a block diagram of a configuration of a facsimile apparatus in accordance with the Embodiment 1. In FIG. 1, numeral 1 denotes a CPU (central processing unit) which controls the overall apparatus in accordance with a program stored in a ROM (read-only memory) 2. A first RAM 3 is used as a work area as required.

A document sheet is read by a contact sensor (CS) 9 and it is compressed through a read control gate array (R-CNT) 10 and stored in an image memory (DRAM) 13, and management information such as an acceptance number, address information, number of pages, storing image memory block information, a resolution, an image size (document sheet width) and number of lines of each page is stored in a second RAM 4. The image information stored in the image memory 13 and the management information stored in the second RAM 4 are decompressed by a record control gate array (W-CNT) 11 upon request by the CPU 1 and recorded on a record sheet by a laser beam printer (LBP) 12.

When a transmission request is issued from the CPU 1, the image information stored in the image memory 13 is compressed in accordance with a mode of a destination apparatus by the CPU 1 and it is applied to a modem 14 and outputted to a line through a network control unit (NCU) 15.

The image data received over the line is applied to the modem 14 through the network control unit 15, demodulated by the modem 14, decompressed by the CPU 1 and checked for an image error, and if it is correct, it is decompressed by the CPU 1 and stored in the image memory 13, and the received management information of the image data is stored in the second RAM 4.

An operator may depress keys on a keyboard (KEY) 8 which is an information input means to set various instructions and enter information, and the contents of the instruction settings and the input information are stored in a third RAM 5. Various instructions, settings and information inputted from the keyboard are displayed on a display unit (LCD) 7 for monitoring. In this case, the CPU 1 detects key input data from the keyboard 8 through a console panel control gate array (OP-CNT) 6 to display necessary data on the display unit 7.

Figure 2:
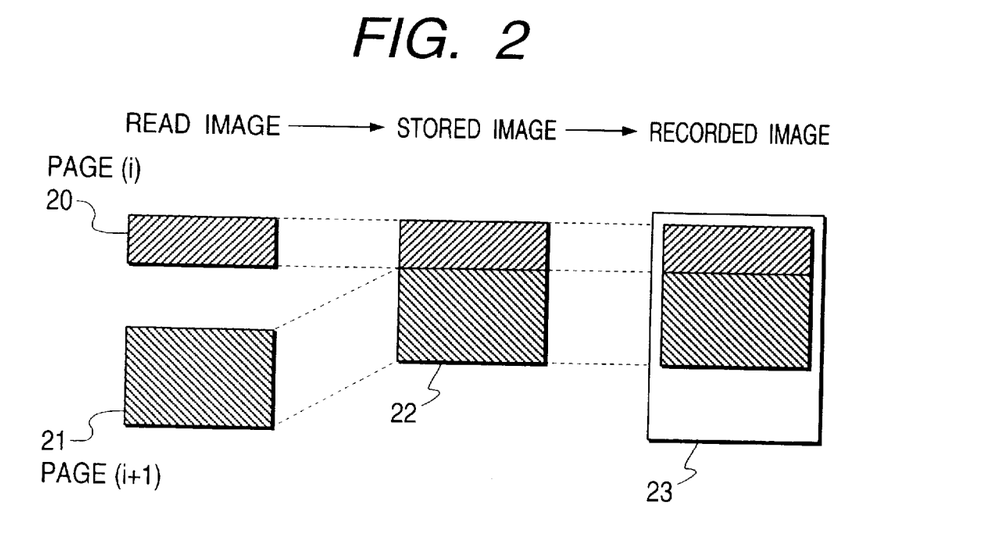
FIG. 2 shows image data when the process of the Embodiment 1 is implemented in the facsimile apparatus.

FIG. 2 is now referred to. FIG. 2 shows a flow of image data in the Embodiment 1. In this example, an i-th page (20) and an (i+1)-th page (21) of the read document sheet are combined and stored, where i is a page count in the read mode. Starting from the left end, a read image, a memory stored image and a received record image are shown. A plurality of pages are first read, and when an image to be transmitted as one page by combining pages comprising the i-th page (20) and the (i+1)-th page (21), the image data of the i-th page (20) is stored in the image memory 13 and then the image data of the (i+1)-th page (21) is stored as the same page data. Namely, the i-th page (20) and the (i+1)-th page (21) are stored in the image memory 13 as one page of image data (22). The image data (22) is then transmitted so that the image recorded on the record sheet (23) of the receiver comprises the images of the i-th page (20) and the (i+1)-th page (21).

Figure 3:
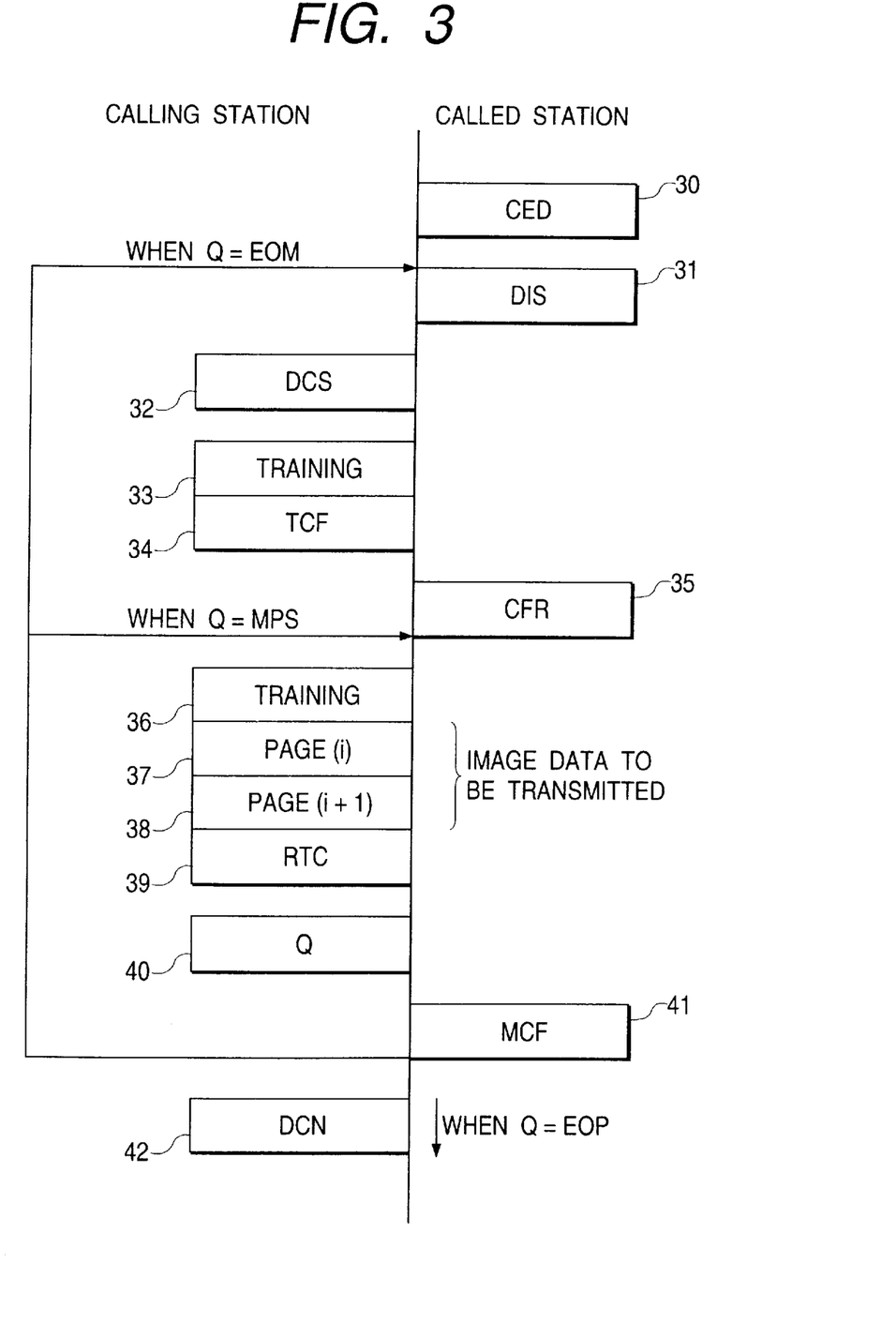
FIG. 3 shows a communication protocol when the process of the Embodiment 1 is implemented in the facsimile apparatus.

FIG. 3 is now referred to FIG. 3 shows a communication protocol in the Embodiment 1. After the line connection, a called station sends a CED (30) and a DIS (31) to a calling station. The calling station receives the DIS (31) and recognizes a length of the record sheet and a resolution of the called station (the receiver in the present example), and sends a DCS (32) to designate a receive mode to the receiver. Then, it conducts training (33), sends a TCF (34), and after the reception of a CFR (35) from the receiver, it conduct training (36), sends the image data (22) having the i-th page (20) and the (i+1)-th page (21) combined (37, 38), and sends an RTC (39). Then, it sends a Q (40) where Q (40) is EOP if no next page is present, EOM if the next page is present and no change is involved in the transmission mode, and MPS if no such change is involved. It then receives an MCF (41), and if Q is the EOM, it sends a DCN (42), disconnects the line and terminates the process. If Q is EOM, it shifts to the reception of the DIS (31), and if Q is the MPS, it shifts to the transmission of the next page, that is, the training (36).

Figure 4:
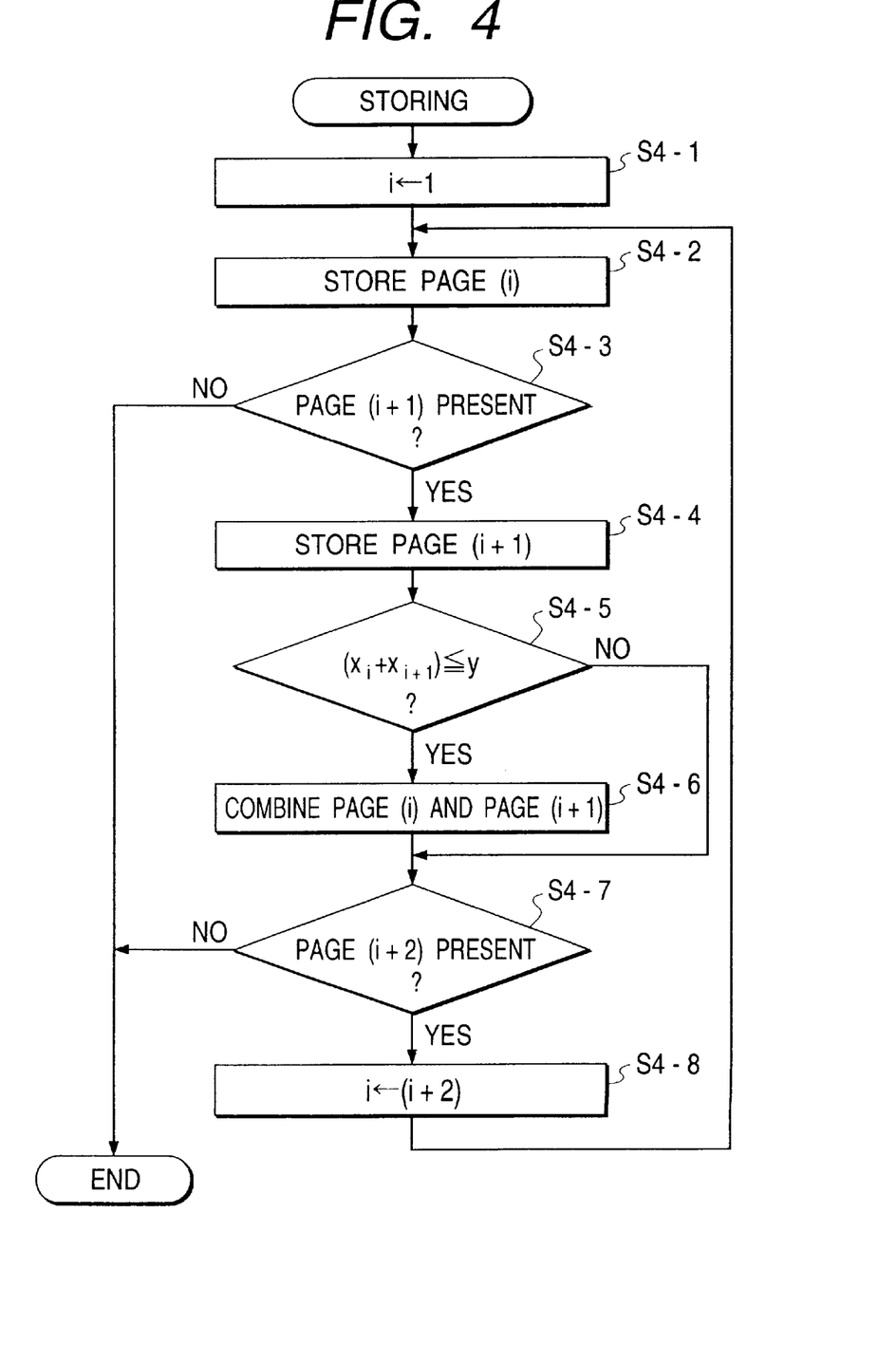
FIG. 4 shows a flow chart of a process of the Embodiment 1 in the facsimile apparatus.

In the facsimile apparatus constructed as shown in FIG. 1, the process procedures of the Embodiment 1 are explained in accordance with the flow of the image data of FIG. 2 and the transmission protocol of FIG. 3 with reference to a flow chart of FIG. 4. In the Embodiment 1, it is assumed that the read document sheet width and the read resolutions are equal for the i-th page (20) and the (i+1)-th page, where i is the page number for the read image and $x_i$ and $x_{i+1}$ are the numbers of read lines of the i-th page (20) and the (i+1)-th page (21), respectively, and y is a threshold to determine whether or not the image data of two continuous pages is combined into one page. If the read width (the document sheet width sensed by the document sheet width sensor 16) is A4 and the read resolution is standard, the number of lines that can be recorded on the A4 record sheet with the standard resolution is set as y.

At the start of memory storing, 1 is set to the read page count i in a step S4-1, and the contact sensor (CS) 9 and the read control gate array (R-CNT) 10 are controlled in a step S4-2 to read the document sheet of the i-th page (20). The read image data is stored in the image memory (DRAM) 13. In a step S4-3, or not the (i+1)-th page (21) is mounted on the document sheet read table, that is, whether or not the next document sheet is mounted is determined, and if it is not mounted, the document sheet reading and the storing are terminated. In the step S4-3, if the next document sheet is mounted, the (i+1)-th page (21), that is, the next page is read and stored in a step S4-4 as it is in the step S4-2. In a step S4-5, a sum $(x_i+x_{i+1})$ of the number of lines $x_i$ of the i-th page 8209 and the number of lines $x_{i+1}$ of the (i+1)-th page (21) previously read and stored is determined and the sum $(x_i+x_{i+1})$ is compared with the threshold y for the number of lines that can be recorded determined from the main scan width of the read image, and if the sum of the numbers of lines $(x_i+x_{i+1})$ is smaller than the threshold y, the i-th page (20) and the (i+1)-th page (21) are combined as shown by the memory image (229 of FIG. 2 in a step S4-6, stores it in the image memory (DRAM) 13 as one page of image and the process proceeds to a step S4-7. If the sum of the numbers of lines $(x_i+x_{i+1})$ is larger than the threshold y in the step S4-5, the combining of the images in the step S4-6 is not conducted and the process proceeds to the step S4-7. In the step S4-7, whether the (i+2)-th page of document sheet, that is, the next document sheet is mounted or not is determined as in the step S4-3. If the next document sheet is not mounted, the document sheet reading and the storing are terminated. If the next document sheet is mounted in the step S4-7, the read page count i is incremented by two in a step S4-8, and the process returns to the step S4-2 and the same process is repeated until the read document sheets are exhausted. In the communication mode, the image (22) stored in the memory is transmitted to the destination station.

Embodiment 2

Figure 5:
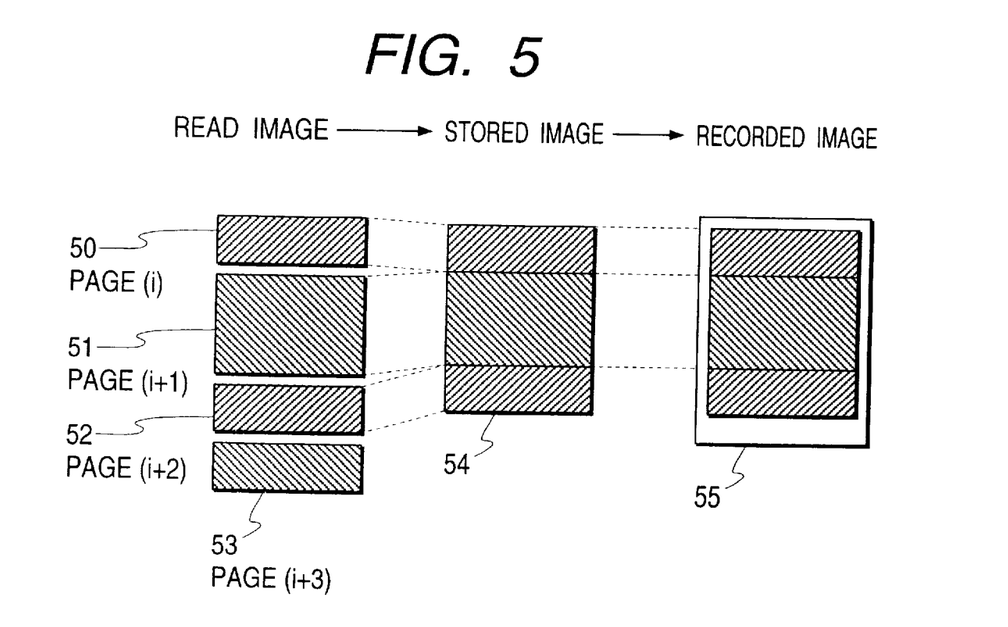
FIG. 5 shows image data when a process of the Embodiment 2 is implemented in the facsimile apparatus.
Figure 6:
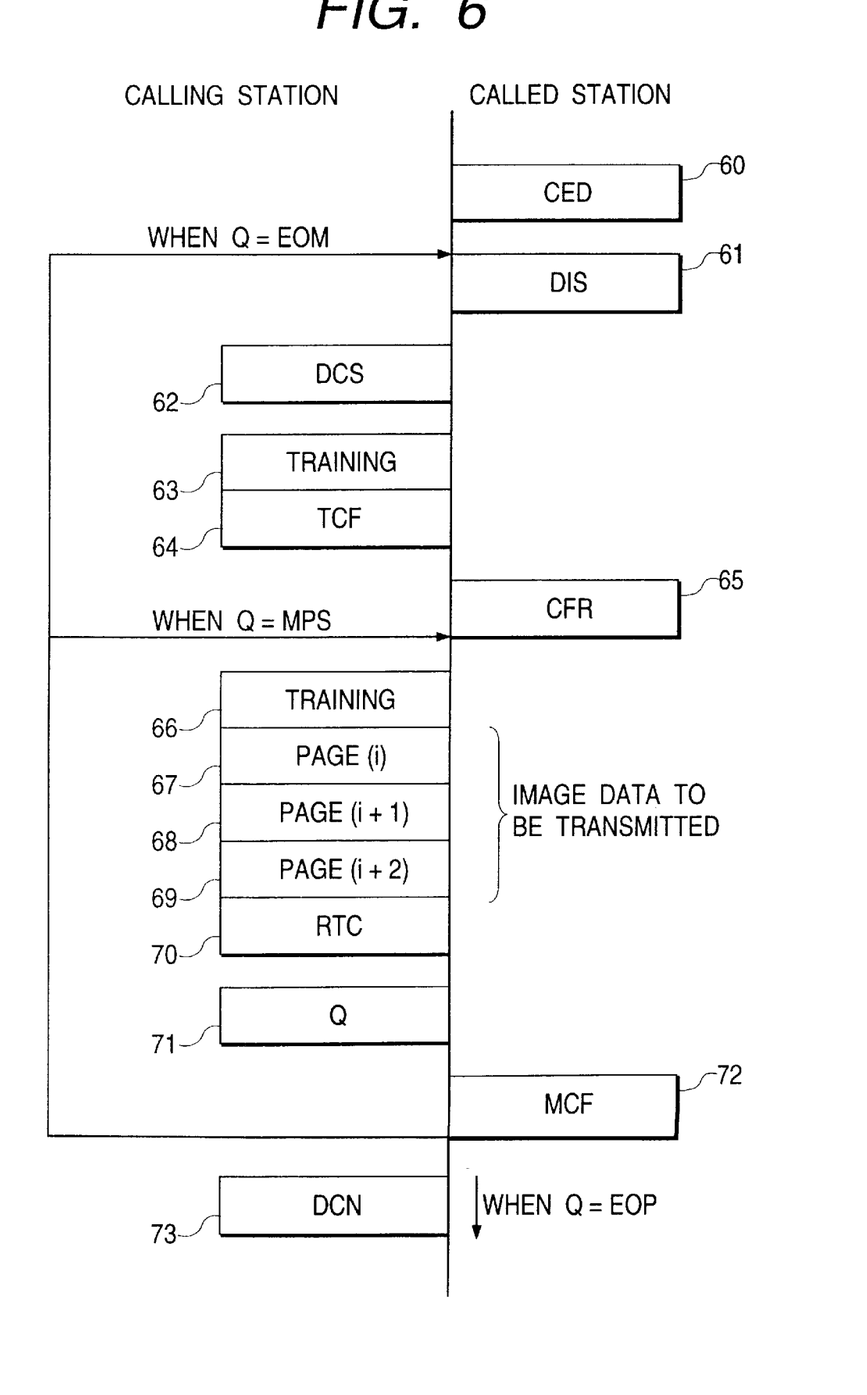
FIG. 6 shows a communication protocol when the process of the Embodiment 2 is implemented in the facsimile apparatus.
Figure 7:
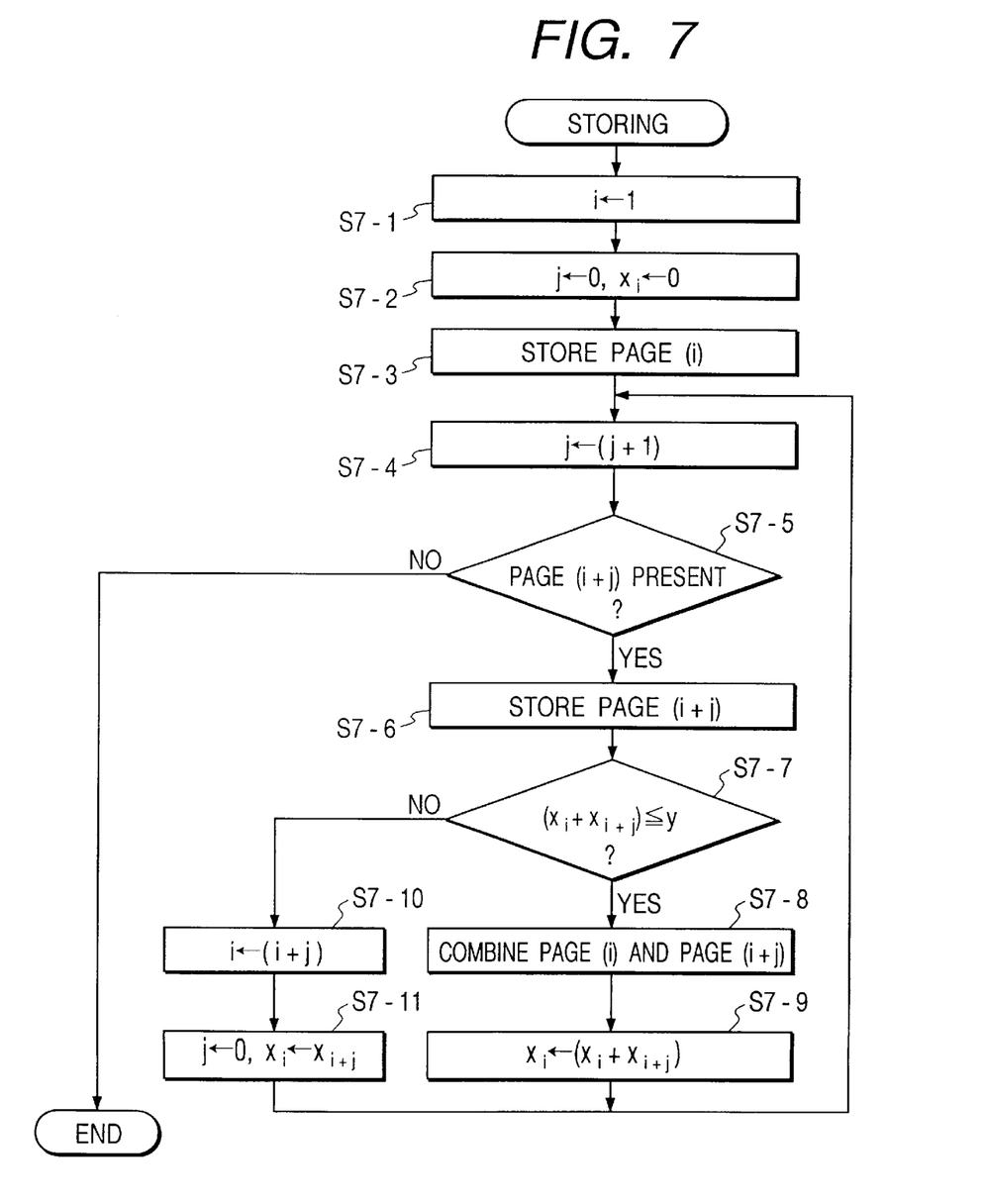
FIG. 7 shows a flow chart of the process of the Embodiment 2 in the facsimile apparatus.

Referring to FIGS. 5, 6 and 7, an Embodiment 2 is explained. A basic configuration of a facsimile apparatus of the Embodiment 2 is identical to that shown in FIG. 1 for the Embodiment 1 and hence FIG. 1 is also referred.

FIG. 5 is first referred. FIG. 5 shows a flow of image data in the Embodiment 2. In the present example, the i-th page (50), the (i+1)-th page (51) and the (i+2)-th page (52) of the read document sheets are combined and the (i+3)-th page (53) is not combined, where i is the page count of the read page. Starting from the left, it shows a read image, a memory stored image and a received record image. First, a plurality of pages are read, and when the image to be transmitted as one combined page comprises the i-th page (50), the (i+1)-th page (51) and the (i+2)-th page (52), the image data of the i-th page (50) is stored in the memory, then the image data of the (i+1)-th page (51) is stored as the same page data. Further, the image data of the (i+2)-th page (52) is stored as the same page data. Namely, the i-th page (50), the (i+1)-th page and the (i+2)-th page are stored in the memory as one page of image data (54). The image data is then sent so that the image recorded on the record sheet (55) in the receiver comprises the images of the i-th page (50), the (i+1)-th page (51) and the (i+2)-th page (52).

FIG. 6 is now referred to FIG. 6 shows a communication protocol of the Embodiment 2. After the line connection, a calling station sends a CED (60) and a DIS (61) to a called station. The calling station receives the DIS (61), recognizes the length of the record sheet and the resolution of the called station (the receiver in the Embodiment 2), sends a DCS (62) to designate a receive mode to the receiver. Then, it conducts training (63), sends a TCF (64), and after it receives a CFR (65) from the receiver, it conducts training (66), combines (54) the image data of the i-th page (50), the (i+1)-th page (51) and the (i+2)-th page (52), sends it (67, 68, 69) and send an RTC (70). Then, it sends Q (71), where Q (71) is an EOP when the next page is not present, an EOM when the next page is present and a change is involved in the transmission mode, and an MPS when no such change is involved. Then, it receives an MCF (72) and if Q is the EOP, it sends a DCN (73), disconnects the line and the process is terminated. If Q is the EOM, it shifts to the reception of the DIS (61), and if Q is the MPS, it shifts to the transmission of the next page, that is, the training (66).

In the facsimile apparatus constructed as shown in FIG. 1, the process procedures of the Embodiment 2 are explained in accordance with the flow of the image data of FIG. 5 and the transmission protocol of FIG. 6. In the Embodiment 2, it is assumed that the read document sheet width and the read resolution are equal for the i-th page (50), the (i+1)-th page (51) and the (i+2)-th page (53), where i is the page number for the read images, $x_i$ is a total number of lines of the combined image from the i-th page (50) to the page combined to the i-th page (50) in the memory, j is the page count from the i-th page (50) of the image data to be combined to the i-th page, $x_{i+j}$ is the image data to be combined to the i-th page (50), that is, the number of lines of the (i+j)-th page and y is a threshold to determined whether or not a plurality of continuous pages are to be combined into one page. If the read width (the document sheet width sensed by the document sheet width sensor 16) is A4 and the read resolution is standard, the number of lines that can be recorded on the A4 record sheet with the standard resolution is set to y as the threshold.

At the start of memory storing, 1 is initially set to the read page count i in a step S7-1. In a step S7-2, 0 is set to the page count j and the total number of lines $x_i$. In a step S7-3, the contact sensor (CS) 9 and the read control gate array (R-CNT) 10 are controlled to read the document sheet of the i-th page (50). The read image data is stored in the image memory (DRAM) 13. The number of read lines of the i-th page (50) is set to the total number of lines $x_i$. In a step S7-4, the page count j is incremented by one, and in a step S7-5, whether or not (i+j)-th page of document sheet is mounted on the document sheet read table, that is, whether or not the next document sheet is mounted is determined. If it is not mounted, the document sheet reading and the storing are terminated. If the next document sheet is mounted in the step S7-5, the (i+j)-th page, that is, the next page is stored in the memory in a step S7-6 as it is in the step S7-3. The number of read lines of the (i+j)-th page is set to $x_{i+j}$. In a step S7-7, a sum $(x_i+x_{i+j})$ of the total number of lines $x_i$ of the image and the total number of lines $x_{i+j}$ of the (i+j)-th page previously read and combined is determined, the sum $(x_i+x_{i+j})$ is compared with the threshold y for the number of lines that can be recorded determined from the main scan width of the read image. If the sum $(x_i+x_{i+j})$ of the numbers of lines is smaller than the threshold y, the i-th page and the (i+j)-th page are combined in a step S7-8 as shown by the memory image (54) of FIG. 5, it is stored in the image memory (DRAM) 13 as one page of image and the process proceeds to a step S7-9 to add the number of lines $x_{i+j}$ of the combined image to the total number of lines $x_i$. Then, the process proceeds to the step S7-4. If the sum $(x_i+x_{i+j})$ of the numbers of lines is larger than the threshold y in the step S7-7, the page count j of the combined image is added to the count i of the read page in a step S7-10, and in a step S7-11, 0 is set to the page count j and the number of lines $x_{i+j}$ of the (i+j)-th page is set to the total number of lines $x_i$. The process then proceeds to a step S7-4 and the same process is repeated until the read document sheets are exhausted. In the communication mode, the image (54) stored in the memory is transmitted to the transmission destination.

In accordance with the Embodiments 1 and 2 of the present invention, since the number of lines of the images of a plurality of input pages is recognized and the plurality of pages are combined in accordance with the recognized number of lines and it is outputted as one page of image, the problem that the image is recorded only at the top of the record sheet in the receiver and a large blank is left at the bottom is avoided.

Embodiment 3

A process for combining a plurality of pages of polling transmission images is now explained.

A basic configuration of a facsimile apparatus of the Embodiment 3 is identical to that shown in FIG. 1 for the Embodiment 1 and hence FIG. 1 is also referred. The variables are also identical to those of FIG. 1 and the explanation thereof is omitted.

Figure 8:
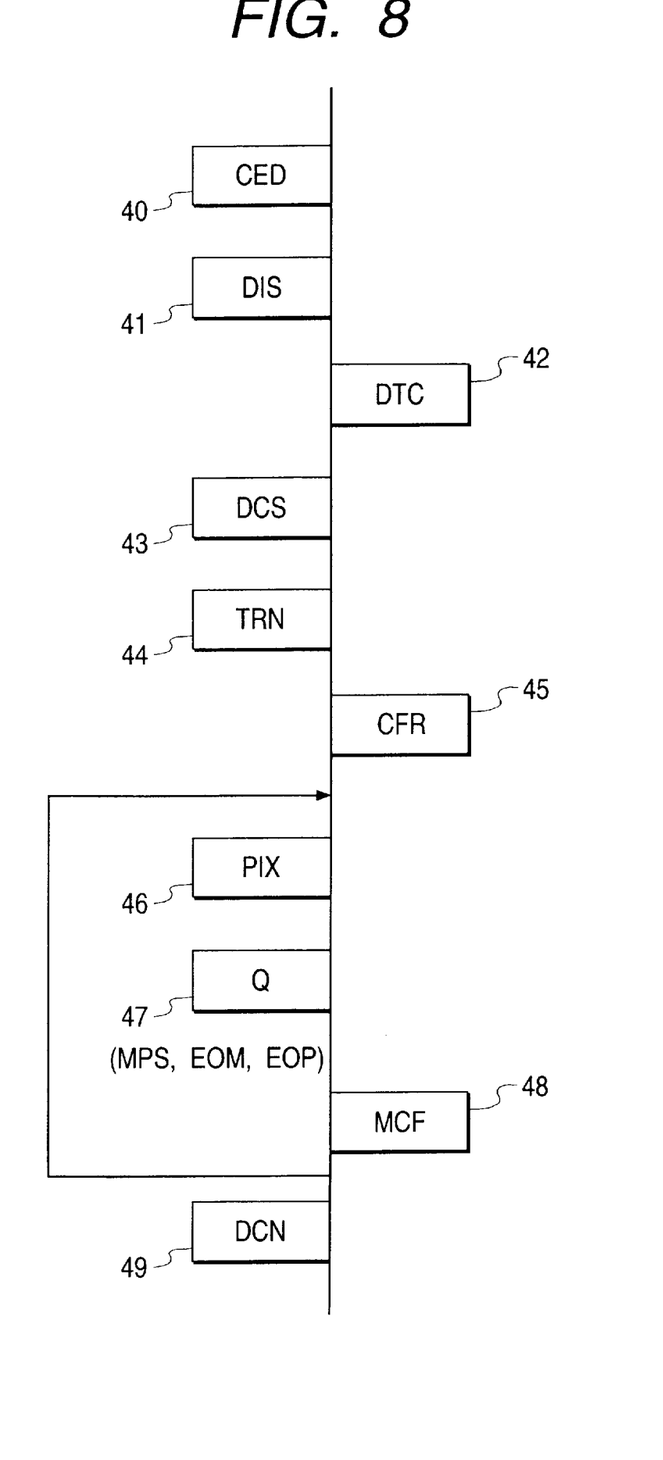
FIG. 8 shows a communication protocol in the polling transmission mode in the facsimile apparatus.

FIG. 8 shows a communication protocol of polling communication of the facsimile apparatus of the present embodiment. In FIG. 8, when a polling image is previously stored for polling in the image memory 13 and the document sheet is not mounted on the document sheet table and when a call is received, a CED signal 40 is first sent and then a DIS signal 41 is sent to inform to the destination station of the presence of the polling image. When the destination station then sends a DTC signal 42 indicating to send the image of the document sheet, it designates the reception by a DCS signal 43. Then, it conducts training by a TRN signal 44, and when it receives a CFR signal 45, it sends a PIX signal 46, a Q signal 47 and an MCF signal 48 (detail will be described in conjunction with FIG. 9) as the transmission of the polling image in the image memory 13. When the transmission of the image is completed, it sends a DCN signal 49 and the communication process is terminated.

Figure 9:
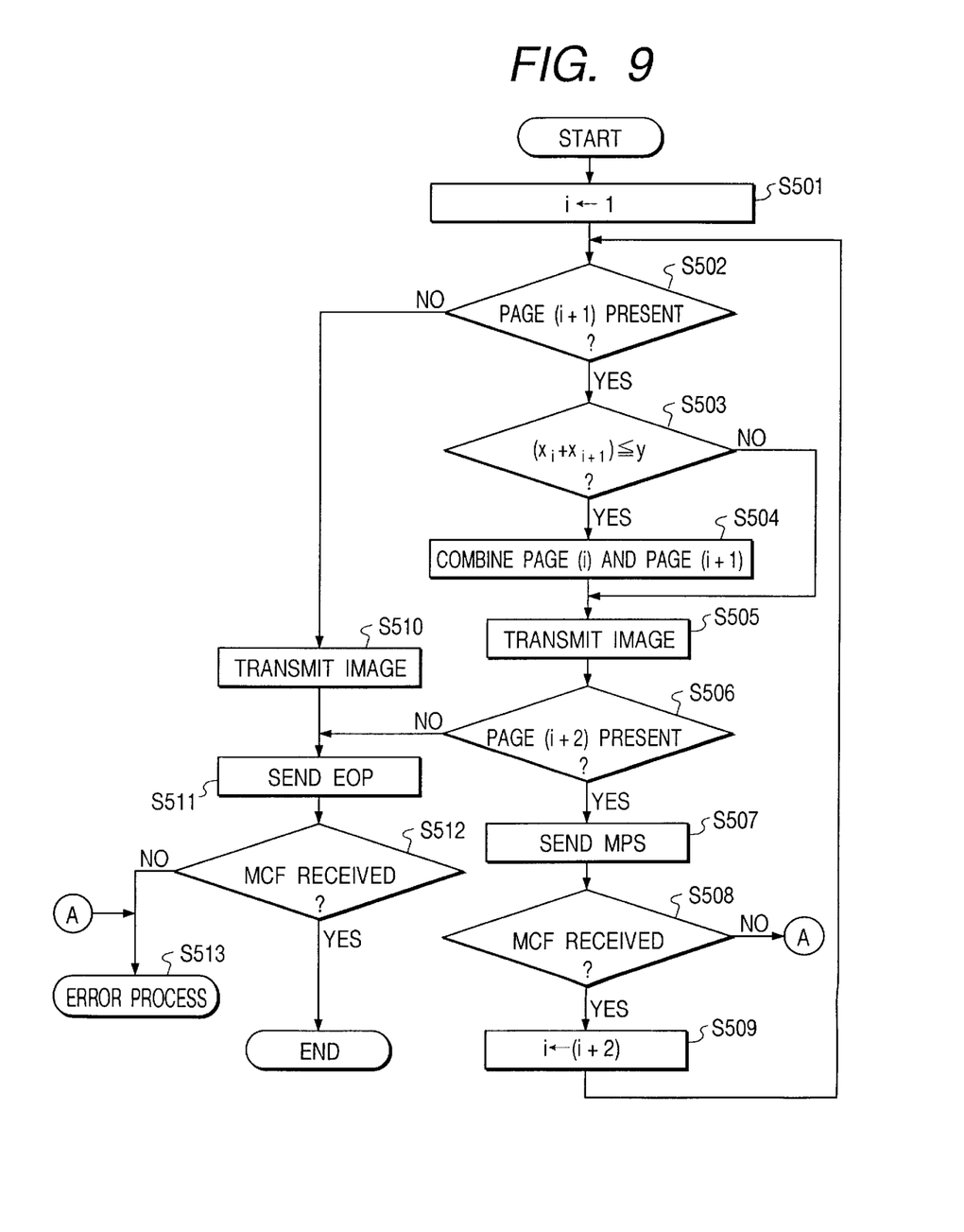
FIG. 9 shows a flow chart of a control protocol of the process for the image transmission as shown in FIG. 8.

FIG. 9 shows a flow chart of a control protocol of the process of the image transmission part of FIG. 8. In FIG. 9, the read page count i is initially set to 1 in a step S501. In a step S502, whether or not the (i+1)-th page is present in the image memory is determined. If the (i+1)-th page is present in the image memory 13, a sum $(x_i+x_{i+1})$ of the number of lines $x_i$ of the i-th page and the number of lines $x_{i+1}$ of the (i+1)-th page is compared with the threshold y for the number of lines that can be recorded. If the sum $(x_i+x_{i+1})$ of the numbers of lines is smaller than the threshold y, the i-th page and the (i+1)-th page are combined in a step S504 and the image is transmitted as one page of image in a step S505. If the sum $(x_i+x_{i+1})$ of the numbers of lines is larger than the threshold y, the step S504 is skipped and the images are not combined, and in the step S505, it is transmitted as one page of image as it is.

In a step S506, whether or not the (i+2)-th page of image is present in the image memory 13 determined. If it is present in the image memory 13, an MPS signal is sent in a step S507 to inform the presence of the next page. In a step S508, whether or not an MCF signal has been received from the destination station for the MPS signal is determined. If the MCF signal has been received, the read page count i is incremented by two in a step S509, and the process returns to the step S502 to repeat the same process as that described above. If the MCF signal has not been received in the step S508, an error process is conducted in a step S513.

On the other hand, if the (i+1)-th page is not present in the image memory 13 in the step S502, that page of image is sent in a step S501 and in a step S511, an EOP signal is sent, and in a step S512, whether or not the MCF signal has been received is determined. If the MCF signal has been received, the process is terminated, and if the MCF signal has not been received, an error process is conducted in a step S513. If the (i+2)-th page of image is not present in the image memory 13 in the step S506, the EOP signal is sent in the step S511 and the same process as that described above is conducted.

In FIG. 9, uncombined stored images are combined when they are transmitted. Alternatively, as shown in FIGS. 4 and 7, a plurality of pages of polling transmission images may be previously combined and stored, and at the transmission, the combined stored image may be read from the image memory 13 and transmitted.

Figure 10:
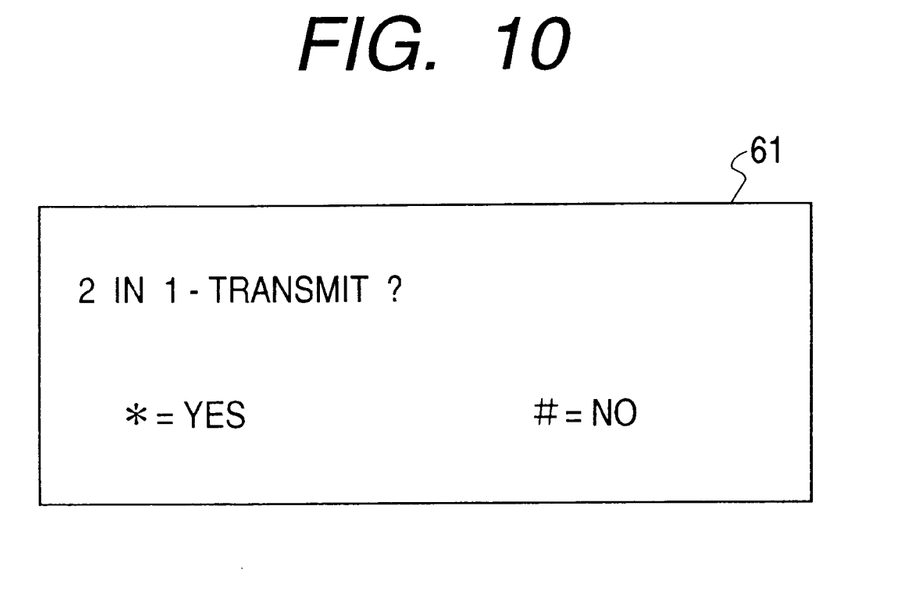
FIG. 10 shows a method of setting the transmission by coupling a plurality of pages in storing the transmission images or polling images in the facsimile apparatus.

FIG. 10 shows a method of setting the transmission with combination of a plurality of pages (referred to as "2-in-1 transmission") when the image is transmitted or the polling image is read and stored. When a document sheet is mounted on the document sheet mount and an address key or a memory polling key on the keyboard 8 is depressed, a display content 61 as shown in FIG. 10 is displayed on the display unit 7. When the 2-in-1 transmission is to be conducted, a key * is depressed, and when the 2-in-1 transmission is not to be conducted, a key # is depressed.

When the key * is depressed, the document sheet is read and the images are stored in the image memory 13 in the 2-in-1 transmission mode. In the transmission, the process of the Embodiment 1 is conducted, and in the polling transmission, the process of the Embodiment 3 is conducted. When the key # is depressed, the document sheet is read and the images are stored in the image memory 13 in the normal transmission mode.

In accordance with the Embodiment 3 of the present invention, in the polling transmission mode, a plurality of continuous pages are combined into one page of image for transmission. Thus, the blank area on the record sheet of the destination station can be eliminated and the waste of the record sheet is prevented.

In accordance with the facsimile apparatus of the Embodiment 4 of the present invention, when the transmission image or the polling image is stored in the memory, the user may selectively set the 2-in-1 transmission mode by the setting means.

What is claimed is:

1. A data outputting apparatus comprising:
   input means for inputting a plurality of pages of data;
   recognition means for recognizing a size of the data inputted from said input means;
   determination means for determining a predetermined size of a record sheet on a basis of only a width of the data recognized by said recognition means;
   combining means for combining a plurality of pages of data inputted by said input means into one page of data in accordance with the size of the data recognized by said recognition means and the predetermined size of the record sheet determined by said determination means;
   data storing means for storing the data combined into one page by said combining means;
   management data storing means for storing management data of the data stored in said data storing means; and
   output means for outputting from said data storing means the data combined into one page by said combining means.

2. An data outputting apparatus according to claim 1 wherein said input means is read means for reading a document sheet and includes detection means for detecting a width of the document sheet, and said combining means combines the plurality of pages of image data into one page of image data in accordance with the width of the document sheet detected by said detection means and the number of lines of each page.

3. An data outputting apparatus according to claim 2 wherein said combining means compares a sum of the numbers of pages of respective ones of the plurality of pages with the number of lines corresponding to the length of a record sheet of a standard size corresponding to the width of the document sheet, and combines the plurality of pages of image data into one page of image data when the sum of the numbers of pages of respective ones of the plurality of pages is not larger than the number of lines corresponding to the length of the record sheet of the standard size.

4. An data outputting apparatus according to claim 1 wherein said combining means compares a sum of the numbers of lines of respective ones of the plurality of pages with a predetermined number of lines and combines the image data of the plurality of pages into one page of image data when the sum of the numbers of lines of respective ones of the plurality of pages is not larger than the predetermined number of lines.

5. An data outputting apparatus according to claim 4 wherein the predetermined number of lines is the number of lines corresponding to a length of a record sheet of a standard size.

6. An data outputting apparatus according to claim 1 wherein said output means is transmission means.

7. An data outputting apparatus according to claim 1 wherein said combining means combines a plurality of continuous pages of image data into one page of image data.

8. An data outputting apparatus according to claim 1 wherein said image data outputting apparatus is a facsimile apparatus.

9. A data outputting apparatus according to claim 1, further comprising:
   setting means for setting the predetermined size of a record sheet.

10. A data outputting apparatus according to claim 1, wherein said data is image data.

11. A data outputting apparatus according to claim 6, wherein said transmission means conducts polling transmission.

12. A data outputting method comprising the step of:
    inputting a plurality of pages of data;
    recognizing a size of the input data;
    determining a predetermined size of a record sheet on a basis of only a width of the data recognized by said recognizing step;
    combining the plurality of pages of input data into one page of data in accordance with the size of the data recognized and the predetermined size of the record sheet;
    storing management data of the data stored in said storing step; and
    outputting the stored data combined into one page of data.

13. A data outputting method according to claim 12 wherein the input image data is image data derived by reading document sheets and said method further comprising the steps of:
    detecting a width of the document sheet; and
    combining the plurality of pages of image data into one page of image data in accordance with the width of the detected document sheet and the number of lines of each page.

14. A data outputting method according to claim 13 further comprising the steps of:
    comparing a sum of the numbers of lines of respective ones of the plurality of pages with the number of lines corresponding to a length of a record sheet of a standard size corresponding to the width of the document sheet; and
    combining the plurality of pages of image data into one page of image data when the sum of the numbers of lines of the respective ones of the plurality of pages is not larger than the number of lines corresponding to the length of the record sheet of the standard size.

15. A data outputting method according to claim 12 further comprising the step of:
    comparing a sum of the numbers of lines of respective ones of the plurality of pages with a predetermined number of lines; and combining the plurality of pages of image data into one page of image data when the sum of the numbers of lines of the respective ones of the plurality of pages is not larger than the predetermined number of lines.

16. A data outputting method according to claim 15 wherein the predetermined number of lines is the number of lines corresponding to a length of a record sheet of a standard size.

17. A data outputting method according to claim 12 wherein the outputting of one page of image data is transmission.

18. A data outputting method according to claim 12 further comprising the step of:

combining a plurality of continuous pages of image data into one page of image data.

19. A data outputting method according to claim 12 wherein said image data outputting method is a facsimile image data outputting method.

20. A data outputting method according to claim 12, further comprising:

a setting step of setting the predetermined size of a recorded sheet.

21. A data outputting method according to claim 12, wherein said data is image data.

22. A data outputting method according to claim 17, wherein said transmission is polling transmission.

23. A data communication apparatus for temporarily storing in a memory data of a plurality of pages of document sheets read by image reading means and a number of lines of each page and transmitting the data stored in the memory to a predetermined destination station, comprising:

control means for storing a plurality of continuous pages of data into one page of data and storing the combined data in the memory when a sum of the numbers of lines of respective ones of the plurality of continuous pages of data does not reach a predetermined number of lines and transmitting the combined image in a transmission mode; and selecting means adapted for a user to select whether or not the plurality of pages of data are to be combined into one page of data for polling-transmission, wherein said control means combines the plurality of pages of data into one page of data and polling-transmitting the combined data in a polling transmission mode when a polling image is present in the memory.

24. An apparatus according to claim 23 wherein said control means combines the plurality of pages of data into one page of data when the polling image is stored in the memory and transmits the data combined into one page.

25. An apparatus according to claim 21, wherein said data is image data.

26. An apparatus according to claim 23, wherein said data communication apparatus is a facsimile apparatus.

27. A data communication method of temporarily storing in a memory data of a plurality of pages of document sheets read by image reading means and a number of lines of each page and transmitting the data stored in the memory to a predetermined destination station, comprising;

a control step of storing a plurality of continuous pages of data into one page of data an storing the combined data in the memory when a sum of the numbers of lines of respective ones of the plurality of continuous pages of data does not reach a predetermined number of lines and transmitting the combined image in a transmission mode; and a selecting step adapted for a user for selecting whether or not the plurality of pages of data are to be combined into one page of data for polling-transmission, wherein said control step combines the plurality of pages of data into one page of data and polling-transmitting the combined data in a polling transmission mode when a polling image is present in the memory.

28. A method according to claim 27 wherein said control step combines the plurality of pages of data into one page of data when the polling image is stored in the memory and transmits the data combined into one page.

29. A method according to claim 27, wherein said data is image data.

30. A method according to claim 27, wherein said data communication apparatus is a facsimile apparatus.

* * * * *

UNITED STATES PATENT AND TRADEMARK OFFICE
CERTIFICATE OF CORRECTION

PATENT NO. : 6,130,965
DATED : October 10, 2000
INVENTOR(S) : Makato Kobayashi et al.

It is certified that error appears in the above-identified patent and that said Letters Patent is hereby corrected as shown below:

Column 1,
Line 22, "the" (second occurrence) should read -- a --.

Column 2,
Line 64, "to" should read -- to. --.

Column 3,
Line 14, "to" should read -- to. --;
Line 54, "or not" should read -- whether or not --.

Column 4,
Line 43, "to" should read -- to. --.

Column 6,
Line 38, "determined." should read -- is determined. --.

Column 7,
Line 48, "An" should read -- A --;
Line 56, "An" should read -- A --;
Line 66, "An" should read -- A --.

Column 8,
Line 7, "An" should read -- A --;
Line 11, "An" should read -- A --;
Line 13, "An" should read -- A --;
Line 16, "An" should read -- A --;
Line 28, "step" should read -- steps --;
Line 38, "sheet;" should read -- sheet; ¶ storing the extra combined into one page by said combining step; --.

UNITED STATES PATENT AND TRADEMARK OFFICE
CERTIFICATE OF CORRECTION

PATENT NO. : 6,130,965
DATED : October 10, 2000
INVENTOR(S) : Makato Kobayashi et al.

It is certified that error appears in the above-identified patent and that said Letters Patent is hereby corrected as shown below:

<u>Column 10,</u>
Line 20, "an" should read -- and --.

Signed and Sealed this

Twenty-sixth Day of March, 2002

*Attest:*

JAMES E. ROGAN
*Director of the United States Patent and Trademark Office*

*Attesting Officer*